United States Patent [19]

Meserole

[11] 4,099,747
[45] Jul. 11, 1978

[54] AIR DUCT CONNECTING ASSEMBLY

[75] Inventor: Robert Henry Meserole, Littleton, Colo.

[73] Assignee: Johns-Manville Corporation, Denver, Colo.

[21] Appl. No.: 741,319

[22] Filed: Nov. 12, 1976

[51] Int. Cl.² ............................................. F16L 59/14
[52] U.S. Cl. ...................................... 285/174; 285/47; 285/322; 285/424
[58] Field of Search ............... 285/174, 322, 424, 419, 285/47

[56] References Cited

U.S. PATENT DOCUMENTS

| | | | |
|---|---|---|---|
| 672,548 | 4/1901 | Durall | 285/419 X |
| 886,043 | 4/1908 | Ditchburn | 285/322 |
| 942,256 | 12/1909 | Hague | 285/322 |
| 1,005,656 | 10/1911 | Sanders | 285/419 |
| 1,032,078 | 7/1912 | Osborn | 285/419 X |
| 1,148,041 | 7/1915 | Minkler | 285/322 |
| 1,315,904 | 9/1919 | Bever | 285/322 X |
| 2,220,480 | 11/1940 | Forsberg | 285/174 |
| 2,434,219 | 1/1948 | Morrison | 285/322 |
| 3,394,950 | 7/1968 | Jensen | 285/32 X |

*Primary Examiner*—Thomas F. Callaghan
*Attorney, Agent, or Firm*—Robert M. Krone; Joseph J. Kelly; Charles C. Corbin

[57] ABSTRACT

An air duct connecting assembly which consists of sleeve-like male and female connectors. The connectors, which are fabricated from a resilient sheet material, are manipulated from generally flat rectangular blanks into their sleeve-like configurations and are retained therein by the use of lock-tab and matching slot arrangements. One portion of each connector is adapted for insertion into the end of a tubular air duct section, two of which are to be connected, and each has means for mechanically joining the connector to the duct. The other portions of the connectors are adapted to be mated in male and female telescoped relationship. Means are provided on the mating portions of the male and female connectors for locking the connectors in their telescoped relationship.

5 Claims, 9 Drawing Figures

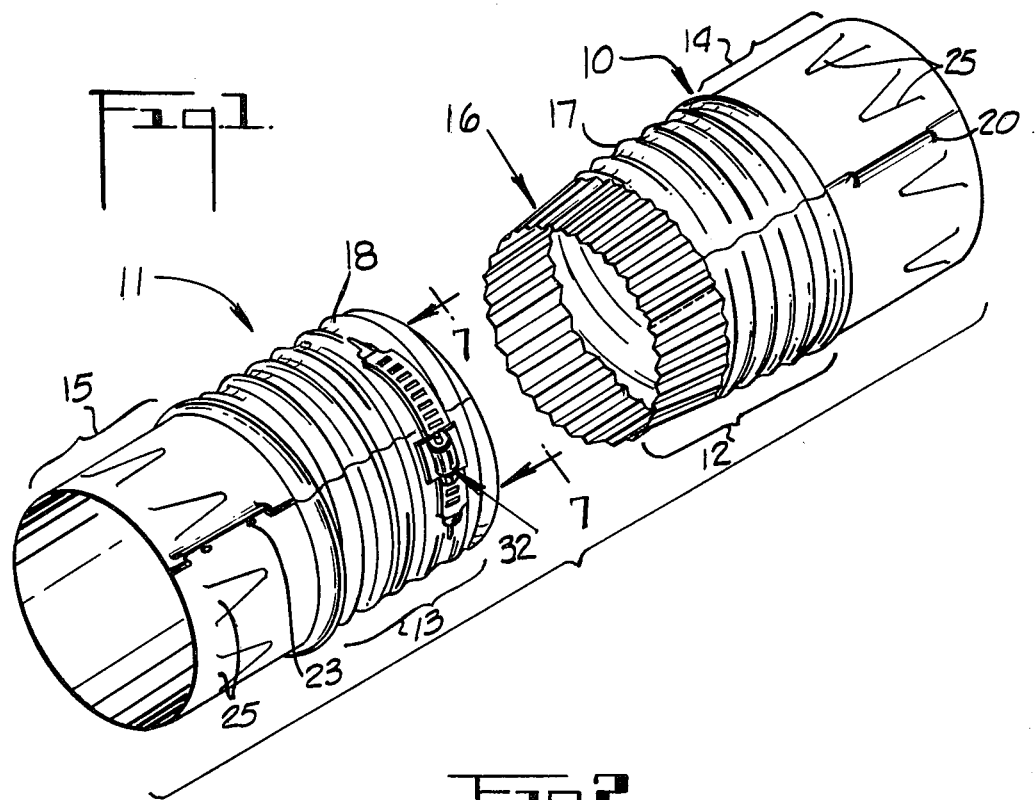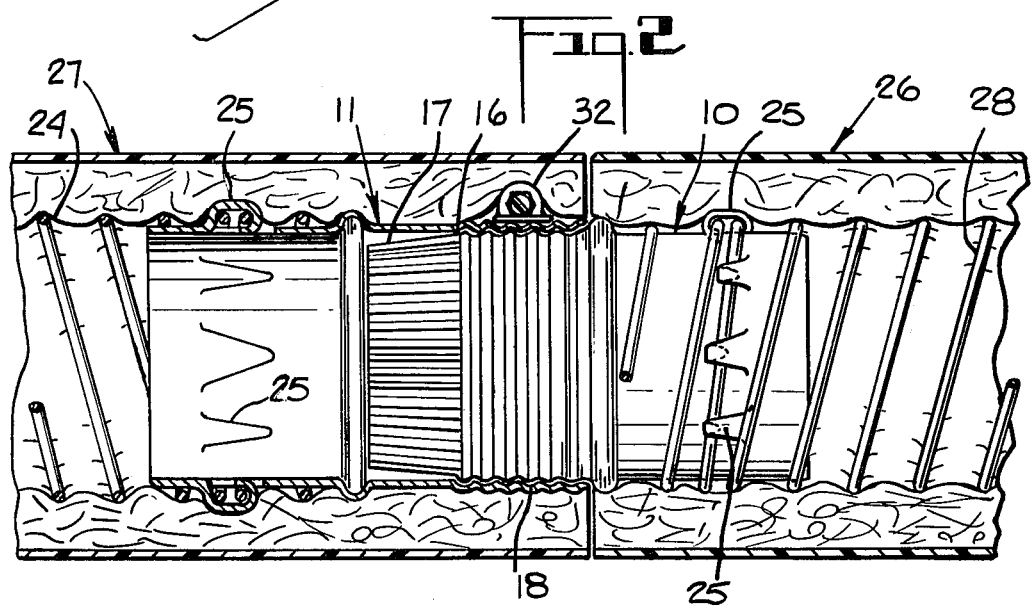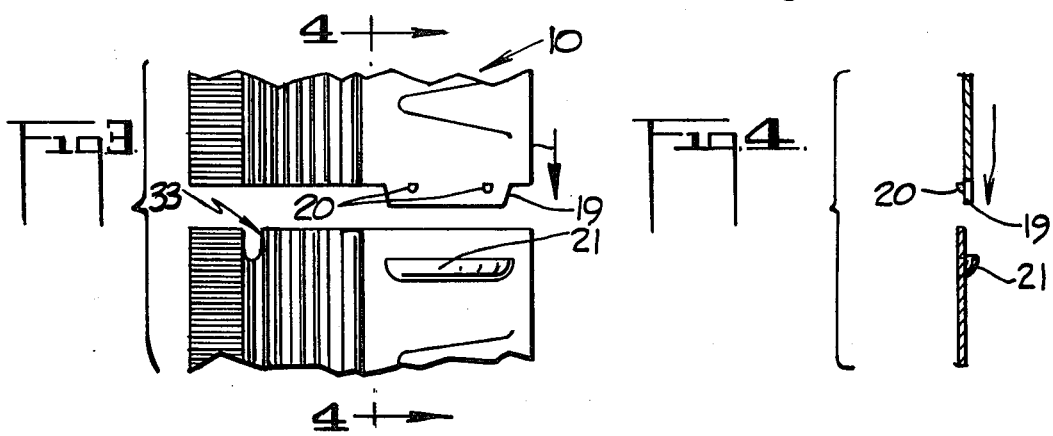

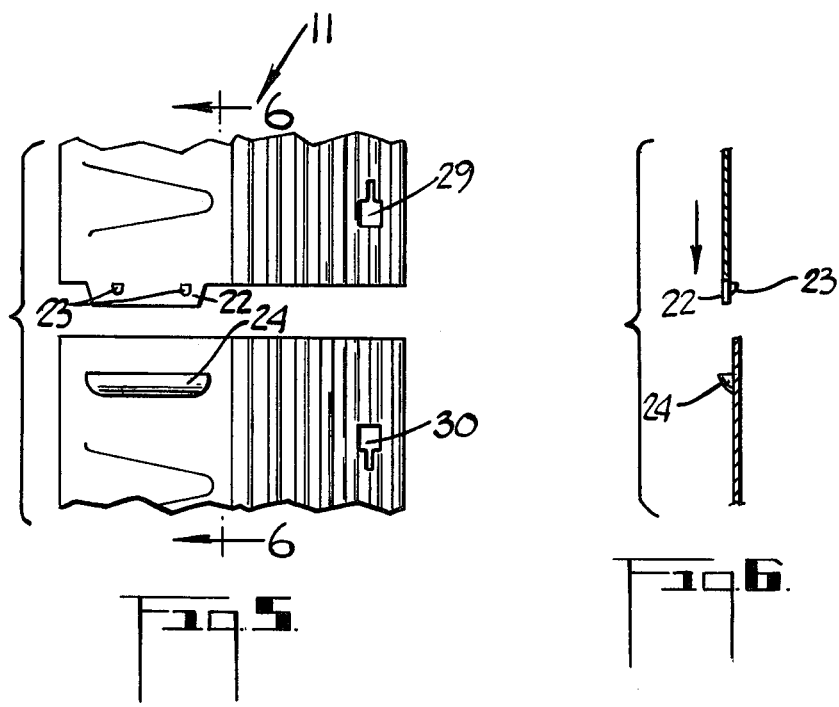
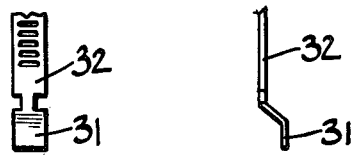
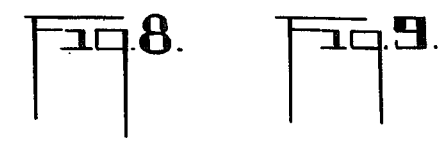
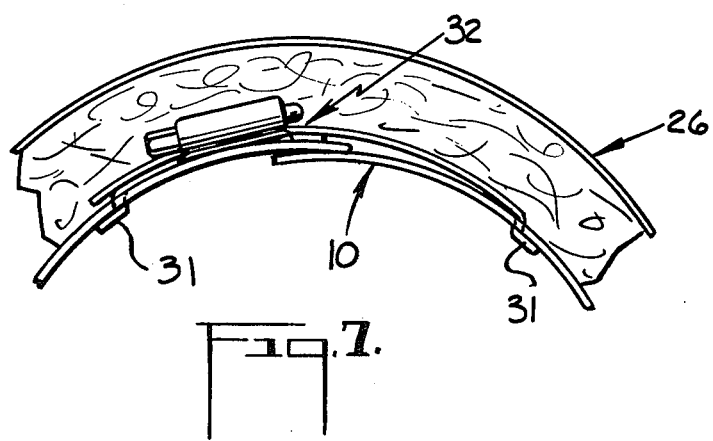

AIR DUCT CONNECTING ASSEMBLY

BACKGROUND OF THE INVENTION

The present invention relates to the fabrication of air-duct connector blanks, their formation into sleeve-like shapes, the joining of the sleeve-like connectors to adjacent tubular air-duct sections, and the inter-locking of the connectors to each other.

Air ducts of the prior art have utilized various means to connect duct sections in axial communication, for examples, the duct connectors described in U.S. Pat. No. 3,857,590 and the other patents listed therein. In some instances, connection of the duct sections was accomplished by abutting or overlapping their ends and wrapping tape around the joints. Another suggestion is to provide "stove pipe" connectors at each end of the duct sections and, using adhesives or sheet metal screws, or other auxiliary fastening means, connecting them to each other. The connector fittings either have been manufactured initially in their sleeve-like shape or have been assembled into this form by the use of sheet metal screws, spot welding, or riveting. The duct connectors of U.S. Pat. No. 3,857,590 employed sleeves which were mounted within air duct ends at the factory. While this duct connector arrangement was satisfactory for joining sections of the flexible duct together, it was not very compatible for use with standard duct fittings. This caused installation problems and delays when the flexible duct was connected to a standard duct or to a standard duct fitting.

In spite of the various connectors utilized in prior art, the need has remained for flexible air duct connectors which are quickly and easily assembled at the factory or in the field; which have means for the quick and positive interlocking of the connectors; and which are compatible for use with standard duct openings.

Consequently, it is an object of the present invention to provide a connector assembly consisting of a male blank and a female blank which simply and quickly can be manipulated into sleeve-like configurations at the factory or in the field, without the use of sheet metal screws, spot welding, or riveting.

It is another object to provide connectors capable of quick and positive connection to one another without the use of tapes, adhesives, or sheet metal screws.

Further objects include the provision of connectors which are compatible with standard duct openings and fittings and connectors which are adapted for quick and positive attachment, in the field or factory, of connector to duct core using a simple hand tool, thereby eliminating the use of adhesives

BRIEF DESCRIPTION OF THE DRAWINGS

FIG. 1 is a view in perspective showing an assembly according to the invention;

FIG. 2 is a sectional view of duct sections connected together by an assembly according to the invention with portions broken away to show the manner in which each of the male and female connectors is attached to the reinforcing helix of an air duct;

FIG. 3 is a fragmentary view of the male connector showing means for joining it in tubular shape;

FIG. 4 is a fragmentary, sectional view taken along the line 4—4 of FIG. 3;

FIG. 5 is a view similar to FIG. 3 but of the female connector;

FIG. 6 is a fragmentary, sectional view taken along the line 6—6 of FIG. 5;

FIG. 7 is a fragmentary, end view in elevation taken from the postion indicated by the line 7—7 of FIG. 1 and showing a clamping device;

FIG. 8 is a frgamentary, top plan view of an end of one of the elements of the clamping device shown in FIG. 7, and FIG. 9 is a fragmentary side view of the portion of the clamping device shown in FIG. 8.

DESCRIPTION OF PREFERRED EMBODIMENT

FIG. 1 shows a male duct connector, generally indicated by the reference number 10 and a female connector, generally indicated by the reference number 11. Although both of the connectors 10 and 11 are shown in their final tubular or sleeve-like configuration in FIG. 1, they are originally manufactured to their appropriate diameter but left unjoined. They are shipped or carried to places of utilization in nested relationship and secured together in final form when ready for use.

The connector 10 is provided with a portion 12 adapted to be inserted into the portion 13 on the connector 11 to form a joint. The connector 10 is provided with a portion 14 adapted to be secured to the duct and the connector 11 has a similar portion 15. The portion 12 has a plurality of parallel ribs 16 which are then crimped in a longitudinal direction to form a reduced section 17 for ready insertion into the portion 13. The portion 13 of the female connector 11 has a plurality of ribs 18 formed in its initial blank as corrugations which are of such depth and width that when the two connectors 10 and 11 are mated, the ribs 16 on the connector 10 nestle in the ribs 18 on the connector 11 (FIG. 2).

As can best be seen by reference to FIG. 3, when the flat blank for the male connector 10 initially is fabricated, one longitudinal edge thereof is provided with an ear 19 and a plurality of downwardly lanced tabs 20 are formed in the ear 19. The opposite edge of the blank for the male connector 10 is lanced upwardly to displace a louver-like portion thereof thus providing a slot 21 into which the tabs 20 are inserted when the edges of the blank for the male connector 10 are slid over each other, with the ear 19 extending over the opposite edge of the blank and the tabs 20 engaging in the slot 21. The blank for the female connector 11 similarly is fabricated with an ear 22 which is lanced to provide tabs 23 and the opposite edge of the blank has a louver-like lancing which provides a slot 24 into which the tabs 23 are engaged to hold the blank in its sleeve-like configuration.

The portions 14 and 15 of the male connector 10 and the female connector 11, respectively, also are provided with a plurality of partially cut hooking tabs 25, their bases remaining integral with the material of the portions 14 and 15 and their free ends being turned toward the ends of the connectors which are inserted into the ducts. As can best be seen by reference to FIG. 2, when either the male connector 10 or its associated female connector 11 is inserted into the end of a sleeve-like duct, generally indicated by the reference numbers 26 or 27, one or more of the partially cut tabs 25 can be crimped over and around a part of a reinforcing helix 28 that is interiorly located in each of the ducts 26 or 27. Crimping the tabs 25 around the respective one of the helices 28 insures a firm mechanical connection between the respective duct end and the associated one of the connectors 10 or 11.

The blank for the female connector 11 is punched during its initial fabrication to provide opposed keyhole openings 29 and 30 (FIG. 5) that are designed to accept the off-set, T-shaped ends 31 of a clamping strap 32 (FIGS. 8 and 9). After the male and female connectors 10 and 11 are manipulated into their sleeve-like configurations, the innermost crimped end of the male connector 10 is inserted into the open end of the female connector 11. The connectors 10 and 11 are then telescoped to a degree such that their respective ribs 17 and 18 are fully engaged as illustrated in FIG. 2. The strap 32 is shortened in the conventional manner to squeeze the female connector 11 tightly around the male connector 10.

Particularly in FIG. 3 it will be noted that the side of the male connector 10 in which the slot 21 is formed also has a stamped out slot 33. When the ear 19 is overlapped and the tabs 20 engage in the slot 21, the straight portion of the edge of the blank on which the ear 19 is located is inserted into the slot 33, thus balancing the engagement and resisting inward collapse or compression of the male connector 10 when the clamp 32 is tightened.

Although the duct sections 26 and 27 are illustrated as having exterior skins or coverings and comprising a tubular layer of insulating material, as well as their inner reinforcing helix 28, it will be appreciated that male and female connectors according to the invention may be utilized with ducts of different types or styles, it being necessary only that such duct be provided with some form of inner helix, or the like, to which the mechanical tabs 25 can be attached.

If the support for the duct is other than the illustrated wire helix 28, such as helically wound strips of corrugated metal, then the portions 14 and 15 may be secured thereto by rivets or other equivalent means.

What is claimed is:
1. An air duct connecting assembly comprising,
   a. a sleeve-like male connector,
   b. a sleeve-like female connector, each of said connectors having circumferentially overlapping and overlapped portions,
   c. means integral with each of said connectors for retaining each connector in said sleeve-like configuration,
   d. said means comprising:
      (i) a tongue extending circumferentially from a longitudinal edge of said overlapping portion, said tongue having a longitudinal extent less than said longitudinal edge and having at least one detent in an intermediate portion thereof, said detent having a radially inwardly protruding locking edge,
      (ii) a slot in said overlapped portion, said slot having at least one edge for cooperating with said locking edge when said detent passes through said slot, and
      (iii) a louver-like radially outwardly protruding hood covering said slot, said hood having a longitudinally extending opening for receiving said tongue and having a longitudinally extending wall portion for limiting movement of said tongue in a circumferential direction, and
   e. cooperating means on said male connector and said female connector for holding said connectors in a telescoped relationship,
   f. means on each of said connectors for mechanically securing each connector to a core of a tubular air duct.

2. A connecting assembly according to claim 1 in which a portion of the exterior surface of the male connector and a portion of the interior surface of the female connector are provided with patterns of circumferential indentations, said indentations being adapted to intermesh when said female connector is constricted around said male connector in telescoped relationship.

3. A connecting assembly according to claim 2 in which the non-intermeshing portion of each connector is provided with a plurality of circumferentially spaced, generally "U" shaped tabs adapted for mechanical connection with the core of a tubular air duct, the apexes of said tabs being pointed towards the intermeshed portions of said connectors.

4. A connecting assembly according to claim 3 and means integral with the inner end of the male connector for preventing collapse thereof when in tubular configuration.

5. A connecting assembly according to claim 2 including means for constricting said female connector over said male connector in telescoped relationship comprising, circumferentially elongated openings in said female connector, a tangential worm driven clamp comprising a flat take-up band member, a tab provided at one end of said band member for being received within a first of said openings to secure said take-up band to the connector, a plurality of spaced transverse slots in said band, a worm and housing unit including a freely journaled worm, said unit secured to one end of a second band member, a tab provided at the other end of said second band member for being received within a second of said connector openings to secure said second band to the connector, said worm being adapted upon rotation to engage the slots to draw the take-up member and to circumferentially constrict the female connector tightly around the male connector.

* * * * *